United States Patent [19]

Minh et al.

[11] Patent Number: 5,290,642

[45] Date of Patent: Mar. 1, 1994

[54] METHOD OF FABRICATING A MONOLITHIC SOLID OXIDE FUEL CELL

[75] Inventors: Nguyen Q. Minh, Fountain Valley; Craig R. Horne, Redondo Beach, both of Calif.

[73] Assignee: AlliedSignal Aerospace, Morris Township, Morris County, N.J.

[21] Appl. No.: 580,722

[22] Filed: Sep. 11, 1990

[51] Int. Cl.$^5$ .................................... H01M 8/10
[52] U.S. Cl. ............................... 429/33; 29/623.3; 29/623.4; 429/127
[58] Field of Search ............... 29/623.3, 623.4; 429/33, 127

[56] References Cited

U.S. PATENT DOCUMENTS

| | | | |
|---|---|---|---|
| 2,627,534 | 2/1953 | Arbogast | 136/175 |
| 4,089,905 | 5/1978 | Cooper et al. | 29/623.1 |
| 4,118,860 | 10/1978 | Buckler et al. | 29/623.5 |
| 4,125,686 | 11/1978 | Kinsman | 429/152 |
| 4,173,066 | 11/1979 | Kinsman | 29/623.1 |
| 4,233,371 | 11/1980 | Dorrestijn | 429/152 |
| 4,276,355 | 6/1981 | Kothmann et al. | 429/26 |
| 4,310,960 | 1/1982 | Parker | 29/157.3 R |
| 4,476,196 | 10/1984 | Poeppel et al. | 429/33 |
| 4,476,197 | 10/1984 | Herceg | 429/32 |
| 4,476,198 | 10/1984 | Ackerman et al. | 429/33 |
| 4,499,663 | 2/1985 | Zwick et al. | 29/623.1 |
| 4,510,212 | 4/1985 | Fraioli | 429/30 |
| 4,666,798 | 5/1987 | Herceg | 429/12 |
| 4,749,632 | 6/1988 | Flandermeyer et al. | 429/12 |
| 4,761,349 | 8/1988 | McPheeters et al. | 429/39 |
| 4,799,936 | 1/1989 | Riley | 29/623.1 |
| 4,816,036 | 3/1989 | Kotchick | 29/623.3 |
| 4,857,420 | 8/1989 | Maricle et al. | 429/30 |
| 4,913,982 | 4/1990 | Kotchick et al. | 29/623.3 |

Primary Examiner—Mark L. Bell
Assistant Examiner—Willie J. Thompson
Attorney, Agent, or Firm—David B. Abel; Hugh P. Gortler; Robert A. Walsh

[57] ABSTRACT

In a two-step densifying process of making a monolithic solid oxide fuel cell, a limited number of anode-electrolyte-cathode cells separated by an interconnect layer are formed and partially densified. Subsequently, the partially densified cells are stacked and further densified to form a monolithic array.

19 Claims, 7 Drawing Sheets

METHOD OF FABRICATING A MONOLITHIC SOLID OXIDE FUEL CELL

BACKGROUND OF THE INVENTION

The U.S. Government has certain rights in this invention as specified in Contract Number DE-AC21-98MC26006 awarded by the Department of Energy.

The invention relates to solid oxide fuel cells and more particularly to a method of densifying the fuel cell core during fabrication. A fuel cell is basically a galvanic conversion device that electrochemically reacts a fuel with an oxidant within catalytic confines to generate a direct current. In a fuel cell, cathode material defines the passageways for the oxidant and anode material defines the passageways for the fuel, and an electrolyte separates the cathode and anode materials. The fuel and oxidant fluids, typically gases, are continuously passed through separate cell passageways. The fuel and oxidant discharges from the fuel cell generally remove the reaction products and heat generated in the cell. The fuel and oxidant are the working fluids and as such are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a hydrocarbon fuel is preferably used as the fuel and oxygen or air is used as the oxidant, and the operating temperature of the fuel cell is between 700° C. and 1,100° C.

The hydrogen passing through the fuel cell reacts with oxide ions on the anode to yield water, which is carried off in the fuel flow stream, with the release of electrons into the anode material. The oxygen reacts with the electrons on the cathode surface to form the oxide ions which then pass into the electrolyte material. Electrons flow from the anode through an appropriate external load to the cathode, and the circuit is closed internally by the transport of oxide ions through the electrolyte. The reaction process is well known and more thoroughly delineated in U.S. Pat. Nos. 4,499,663 and 4,816,036.

The electrolyte isolates the fuel and oxidant gases from one another while providing a medium allowing oxygen ion transfer, as well as voltage buildup on opposite sides of the electrolyte. Fuel and oxidant must diffuse away from the flow stream in the respective passageways to the electrolyte and react at or near the boundary of the electrodes (anode or cathode), and electrolyte, where electrochemical conversion occurs. The electrodes provide paths for the internal movement of electrical current within the fuel cell to the cell terminals, which also connect with an external load. The operating voltage across each cell is on the order of 0.7 volts so the individual cells must be placed in electrical series to obtain a useful load voltage.

See, e.g., Ackerman et al. U.S. Pat. No. 4,476,198. (A monolithic core consisting only of materials active in the electrochemical reactions); Poeppel et al. U.S. Pat. No. 4,476,196 (a monolithic core construction having the flow passageways for the fuel and for the oxidant gases extended transverse to one another); and Fraioli U.S. Pat. No. 4,510,212 (a core construction having both parallel and cross flow paths for the fuel and oxidant gases).

Cellular type fuel cell cores (see U.S. Pat. No. 4,476,198) of the prior art are made by placing the compositions used for the four materials into four distinct slurries. Each slurry is then placed in a reservoir of a squeegee-type device which is pulled over a flat surface and hardens or placticizes into a layer of the material having the desired thickness. In this manner the electrolyte wall or interconnect wall is formed by a first layer of anode material followed by a layer of either electrode or interconnect material and finally by a layer of the cathode material. The layers are bonded together since the binder system is the same in each layer.

U.S. Pat. No. 4,816,036 (Kotchick) teaches another method of forming a cellular core, whereby the compositions for the four materials are individually mixed to a plastic consistency and subsequently hot rolled into thin sheets. The thin sheets can then be hot rolled into multilayer tapes, formed, stacked, and fired as a (i.e., cosintered) monolith to produce the fuel cell with integral fuel and oxidant manifolding.

Theoretically, the fuel cell stack structure of the above-noted patents should provide exemplary power density. However, problems arise because the fuel cell stacks are formed from arrays of anode and cathode sandwiching either an electrolyte or interconnect material in pliant or green form. The various green constituent layers are stacked on top of each other, appropriately oriented, to form the stack structure. The resultant stack structure is made up of all green, or unsintered, constituent parts. As noted, the components of the stack are made of different materials, and thereby requiring one to try to match the coefficient of thermal expansion and firing shrinkage for the different materials as closely as possible to one another to minimize separation problems. Fuel cell stacks made of green precursors that are all consintered display undesirably poor performance due to microcracks which occur in the various layers as a result of the cosintered step if thermal expansion and firing shrinkage matched is not achieved. A resulting cosintered stack produces significantly less current than its theoretical current density due to mixing of reactant gases resulting from the cracks in the stack. In addition, it is difficult to densify the interconnect under conditions suitable for the other cell components. Inadequately densified interconnects allows cross-leakage of reactant gases.

A second problem arises when the multilayer fuel cell stacks of the prior art are densified in that there is migration of the ceramic materials, primarily the interconnect material, into adjacent layers. This migration of the ceramic materials adversely effects the resulting component physical properties of density, porosity, and homogeneity.

A third problem is the slumping of the corrugations during co-firing. As the size of the fuel cell structure increases the green corrugated layers are not stiff enough to support the structure weight during the heat treatment process. Accordingly, a processing method and the resulting fuel cell which eliminate the problems of microcracks, ceramic migration, and slumping would be desirable.

SUMMARY OF THE INVENTION

The foregoing disadvantages are overcome by the following method of fabricating the fuel cell core. The method comprises the steps of (1), individually mixing the anode, cathode, electrolyte and interconnect materials with a binder system; (2) forming thin tapes of the individual layers by either roll milling or slurry tape casting; (3) forming green state multilayer tapes preferably comprising an anode electrolyte-cathode or an anode-interconnect-cathode; (4) cutting and molding the respective green state multilayer tapes into the desired net shape elements; (5) assembling and bonding pairs of anode-interconnect-cathode elements (or alternatively simply interconnect elements) and anode-electrolyte-cathode elements; (6) partially densifying the assembled pairs of elements; (7) stacking and bonding the densified pairs of elements by wetting the contacting surfaces with a bonding agent to promote interbonding of the contacting surfaces to form a stacked assembly; and (8) densifying the stacked assembly to form a monolithic core assembly.

BRIEF DESCRIPTION OF THE DRAWINGS

FIGS. 3 A and B are plan views of the individual electrolyte and interconnect elements;

FIGS. 7(a-c) are perspective views employed to aid description of an alternative method of construction.

DETAILED DESCRIPTION OF THE INVENTION

Figure 1:
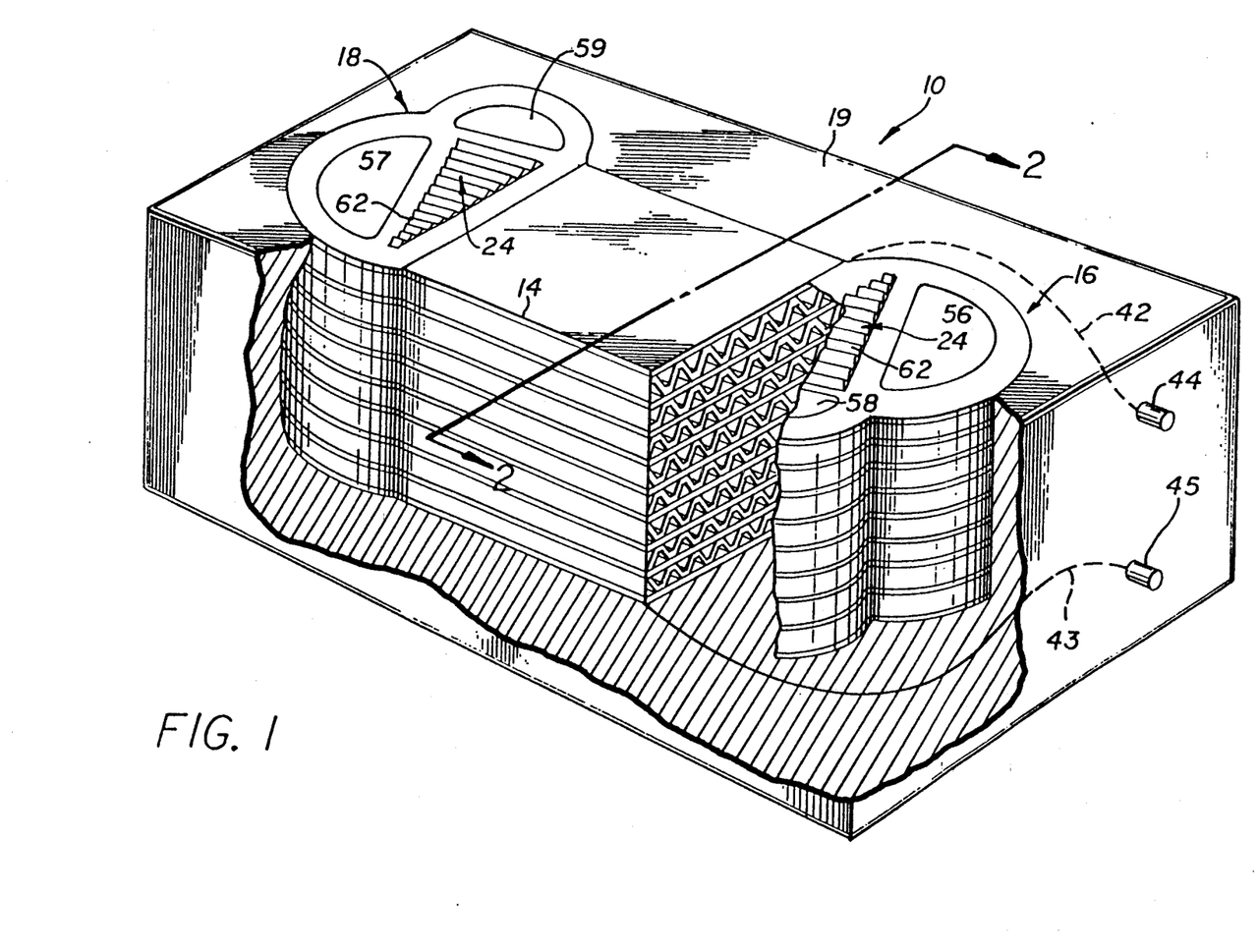
FIG. 1 is a perspective view, partially broken away for clarity of a fuel cell formed according to the present invention.

FIG. 1 shows a monolithic solid oxide fuel cell (MSOFC) 10 of the present invention including a fuel cell core 14 and inlet and outlet manifolding, 16 and 18, at each end of the core 14. The core and manifolds 14, 16, 18 are located within and surrounded by suitable insulation 19. Not shown are supply lines connected to suitable fuel and oxidant sources.

Figure 2:
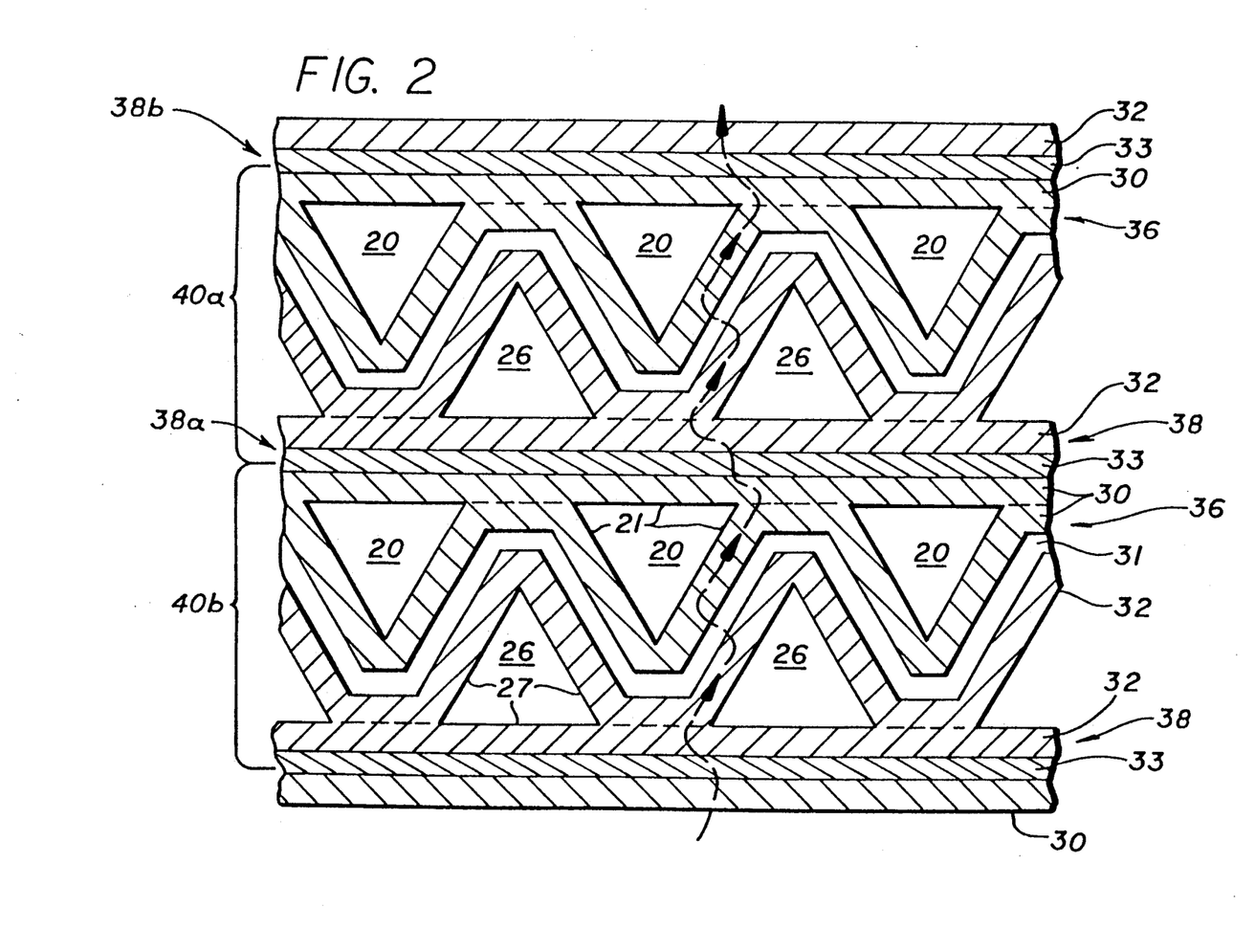
FIG. 2 is a partial, enlarged sectional view of a fuel cell core, the view being taken along line 2—2 of FIG. 1.

FIG. 2 illustrates an enlarged cross-section of the fuel cell core 14 for the MSOFC 10. Within fuel cell core 14 are formed a plurality of fuel passageways 20 and oxidant passageways 26 which are disposed parallel to one another and alternately adjacent one another. The fuel passageways 20 are preferably formed with only an anode material 30 defining the exposed fuel passageway walls 21 while the oxidant passageways 26 are preferably formed with only a cathode material 32 defining the exposed oxidant passageway walls 27. Adjacent fuel and oxidant passageways 20 and 26 are separated by either an electrolyte wall 36 or by an interconnect wall 38. The electrolyte wall 36 comprises thin layers of electrolyte material 31 sandwiched between the anode material 30 and the cathode material 32 forming a trilayer. The interconnent wall 38 comprises a thin trilayer of interconnect material 33 sandwiched between anode material 30 and cathode material 32 to form a trilayer. Two interconnect walls 38 can define the limit of one cell unit 40. In however in the MSOFC 10 of FIG. 1, however, two adjacent cell units 40 share an interconnect wall 38.

The anode, cathode, electrolyte, and interconnect materials 30, 32, 31, and 33 are selected and modified to comply with: (1) electrically conductive aspects of the cathode, anode, and interconnect; (2) the ionic transport and electronic isolation aspect of the electrolyte; and (3) the gas porosity property of the cathode and anode and the gas impervious property of the electrolyte and interconnect. Likewise the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the invention, the interconnect and the electrolyte layers are thin (0.002-0.005 cm) while the sandwiching cathode and anode layers are perhaps the same thickness or possibly up to perhaps ten times this thickness (0.002-0.05 cm).

The MSOFC 10 provides increased power density due to the increased active exposure areas of fuel and oxidant per the corresponding unit flow path volume, and due further to having only the active materials (the anode, cathode, electrolyte, and interconnect) in the fuel cell core 14. The fuel and oxidant passageways 20 and 26, of the core 14 can be very small, and likewise the fuel and oxidant passageway walls 21, 27 can be thin yet self supporting over the small distances across the defined fuel and oxidant passageways 20, 26, making possible shorter current paths and reduced resistance losses, and minimizing diffusion losses by eliminating thick supports entirely.

The inlet and outlet manifolds 16 and 18 each include an oxidant conduit 58, 59 and a fuel conduit 56, 57 and a turning section generally designated by the numeral 24. Turning section 24 defines a plurality of fuel 0 manifold passages 62 and a plurality of oxidant manifold passages 64 as will be described later.

It is envisioned that the MSOFC 10 of the present invention can be used with parallel flow, counter flow or crossflow of the two working fluids. For the purpose of clarity it is assumed that a parallel flow system is being used and therefore manifold 16 shall be referred to as the inlet manifold defining a fuel inlet conduit 56 and an oxidant inlet conduit 58 and manifold 18 shall be referred to as the outlet manifold defining a fuel outlet conduit 57 and an oxidant outlet conduit 59. Each manifold further includes the turning sections 24.

Further to the above, it will be recognized by those skilled in the pertinent art that the electrochemically active fuel cell core of the MSOFC 10 is combined with conduits carrying fuel and oxidant to and from the fuel cell core 14, making a completely functional fuel cell when attached to electrical conductors 42, 43, and encased in the thermal insulation 19. The conductors 42, 43 extend through the insulation 29 to terminals 44, 45 external thereto.

Gaseous fuel is conveyed from a source (not shown) to the fuel inlet conduit 56 formed within the inlet manifold 16. The fuels flows through the fuel manifold passages 62, the fuel passageways 20 in the fuel cell core 14, and the fuel outlet conduit 57 formed within the outlet manifold 18. Likewise, oxidant is carried from a source (not shown) to the oxidant inlet conduit 58 formed within the inlet manifold 16. The oxidant flows through the oxidant manifold passages 64, and the oxidant passageways 26, and the oxidant outlet conduit 59 formed within the outlet manifold 18. The fuel and oxidant react electrochemically across the electrolyte walls 36 separating the fuel and oxidant in the fuel cell core 14. Fuel and oxidant not consumed are discharged through the outlet manifold 18 and subsequently may be combusted with the other reaction products from the MSOFC 10 in an appropriate combustion chamber (not shown).

As can be best seen in FIG. 2, each electrolyte wall 36 is comprised of the layer of electrolyte material 31 sandwiched between the layer of anode material 30 and the cathode material 32. Electrolyte wall 36 electrochemically reacts the fuel and oxidant being conveyed in the fuel and oxidant passageways 20 and 26, respectively, to develop an electrical potential across the electrolyte wall 36. Further, for all of the electrolyte walls 36 thus confined between any pair of adjacent interconnect walls (38a and 38b, for example), there is an in-series electrical connection of the cell units (40a, 40b, for example). The electrolyte walls 36 are corrugated, or backfolded, between the interconnect walls 38 so that the fuel and oxidant passageways 20 and 26 are likewise alternately disposed between any pair of adjacent interconnect walls 38.

Figure 3A:
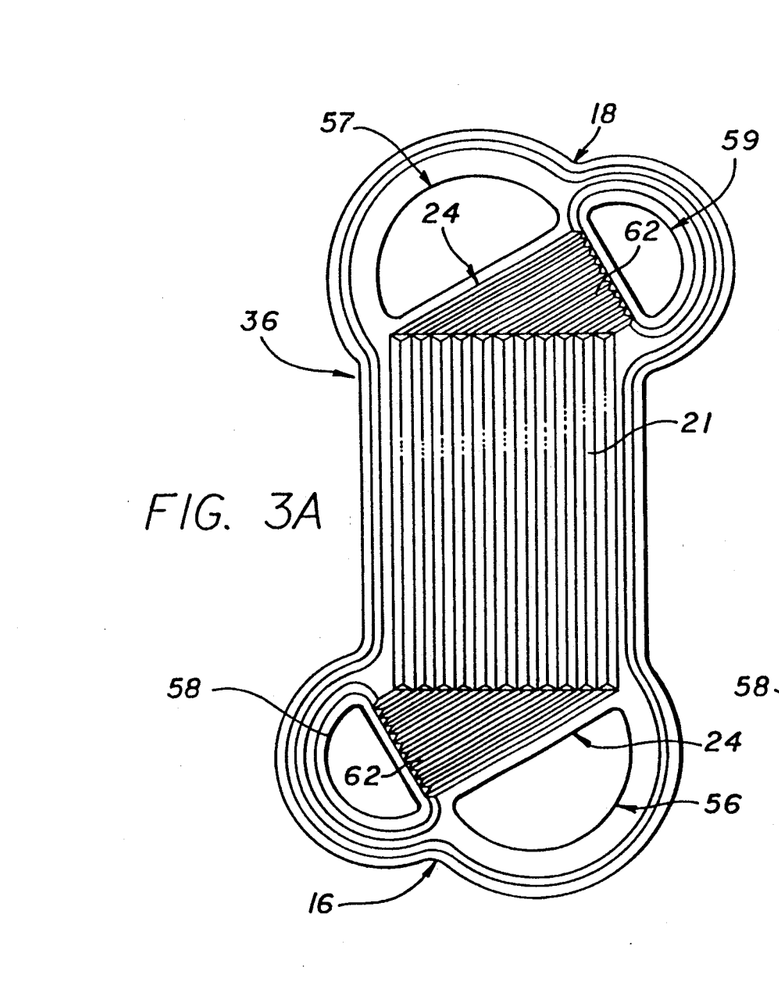
Figure 3B:
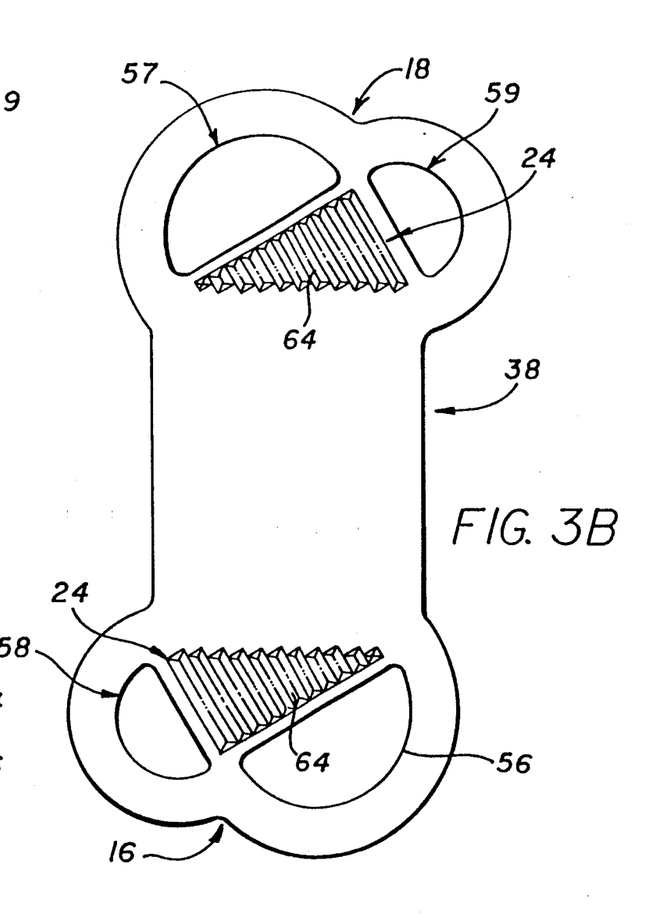

Shown in FIGS. 1, 3A and 3B is the manifolding system to be used in association with the fuel cell core 14. The inlet manifold 16 and the outlet manifold 18 are similar to each other in their ducting of the fuel and oxidant flows. Each defines oxidant inlet and outlet conduits 58 and 59, and fuel inlet and outlet conduits 56 and 57, for connection to suitable oxidant and fuel sources. As will be described below the manifolding 16 and 18 and the fuel cell core 14 can be formed as an integral piece.

Figure 5:
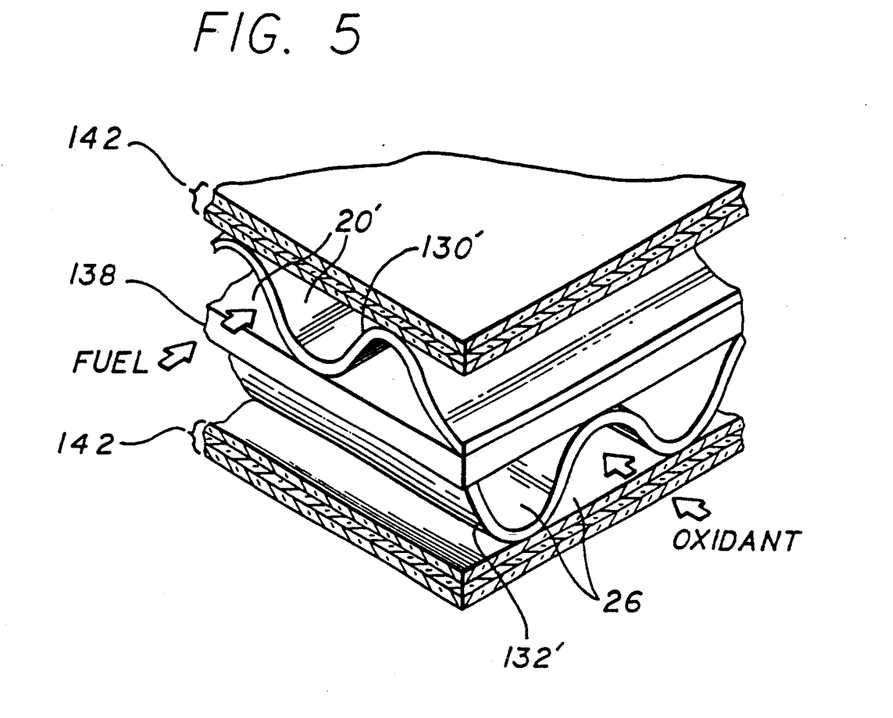
FIG. 5 is a partial, enlarged sectional view of a portion of the fuel cell of FIG. 4.

Shown in FIG. 3A are electrolyte wall 36 impressions or corrugations 68 extending between the manifolds 16 and 18, and which, when alternatively stacked with the interconnect walls 38 (see FIG. 3B), form the fuel and oxidant passageways 20, 26. At each end of the corrugations 68 of the electrolyte wall 36 are a plurality of manifold corrugations 70 which extend parallel with each other and with the manifold corrugations 70 at the opposite end of the fuel and oxidant passageways 20, 26. Each manifold corrugation 70 has a height less than the height of the fuel and oxidant passageways 20 and 26 (see FIG. 5). Inlet and outlet fuel manifold passageways 62 extend from the ends of the fuel cell core fuel passageways 20 to the fuel inlet and outlet manifolds 16 and 18. Likewise, inlet and outlet oxidant manifold passageways 64 extend from the ends of the oxidant passageways 26 to the oxidant inlet and outlet conduits 58 and 59 formed internally to manifolds 16 and 18.

Figure 4:
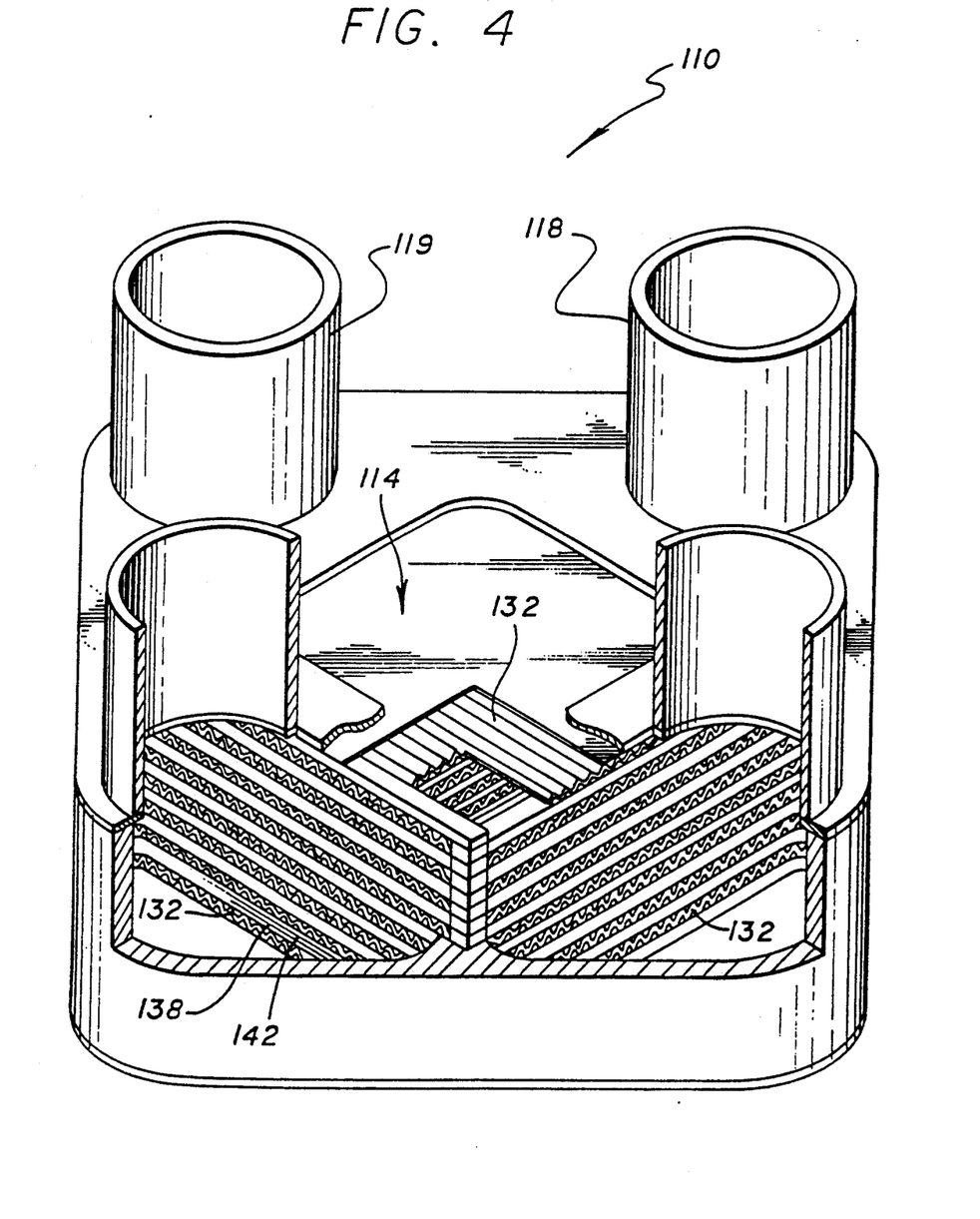
FIG. 4 is a perspective view of an alternative configuration for a fuel cell formed according to the present invention.

An alternative construction of a crossflow monolithic solid oxide fuel cell (MSOFC) 110 is depicted in FIG. 4 and exploded FIGS. 5 and 7a–7c. the crossflow MSOFC 110 includes a core section 114, oxidant inlet manifold 116, fuel inlet manifold 117, oxidant outlet manifold 118 and fuel outlet manifold 119. An anode 130, electrolyte 136, and a cathode 132 are formed into an electrolyte trilayer 142. Another anode 130' and cathode 132' are formed into a corrugated, backfolded or ribbed (FIGS. 7a–7c configuration and attached to opposite sides of the electrolyte 131 or the electrolyte trilayer 142, adjacent the respective similar anode 130 and corrugated cathode 132. The corrugated anode 130' and cathode 132' layers are arranged with the corrugations at crossing angles to one another, preferably at right angles. Interconnect layers 138 are stacked and attached to the corrugated anode 130' and cathode 132' at opposite sides of the respective corrugations from the planar electrolyte trilayer 142. A plurality of these stacked elements form a complete crossflow MSOFC 110. The method of forming this crossflow MSOFC 110 is analogous to the method of forming the parallel flow MSOFC 10.

PREFERRED METHOD OF FABRICATING THE FUEL CELL

Figure 6:
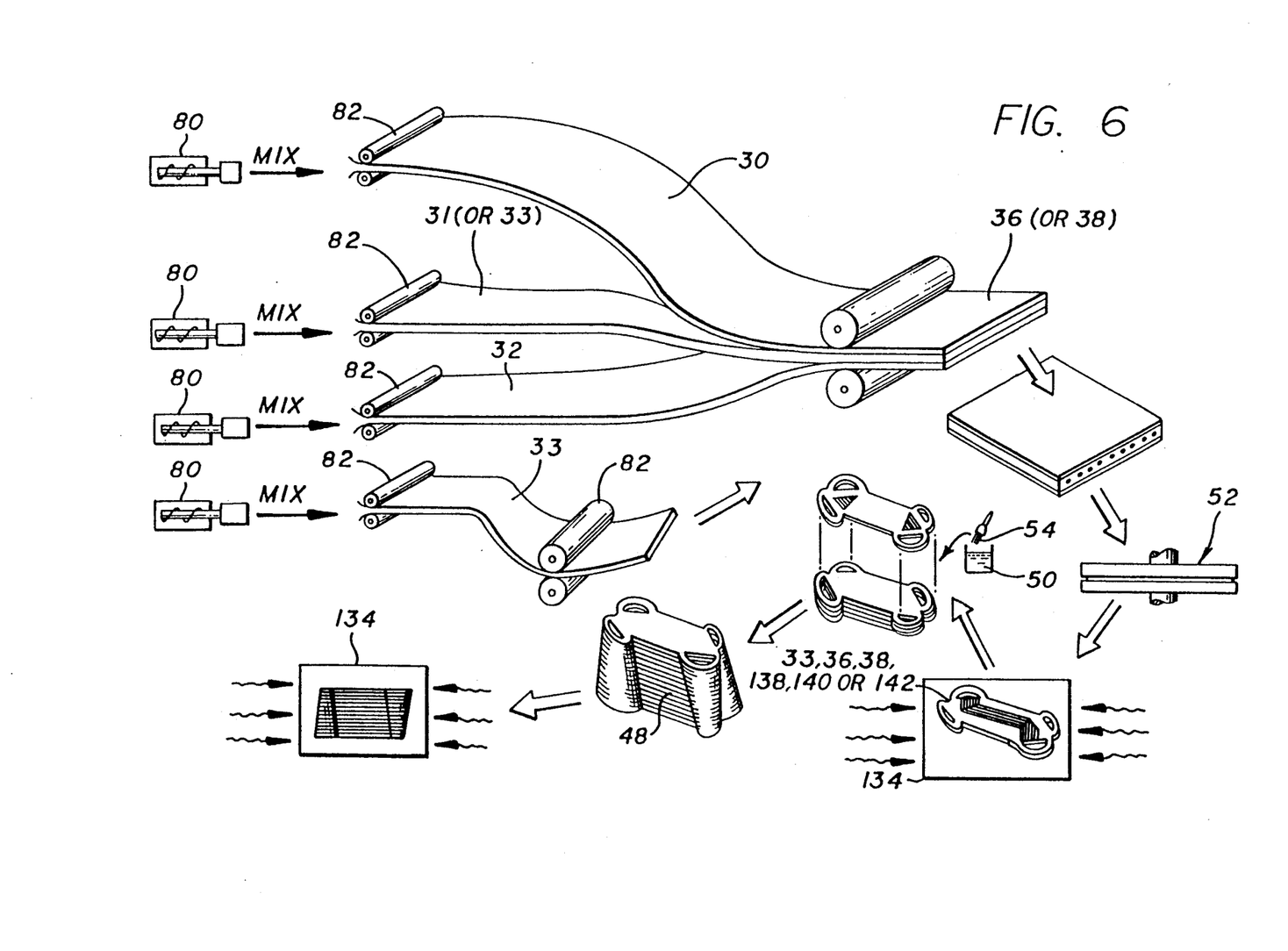
FIG. 6 is a diagrammatic depiction of the two-step firing process required to form a fuel cell of the present invention.

Shown in FIG. 6 is a process for manufacture a MSOFC 10. Ceramic powders for each of the materials. (e.g., strontium-doped lanthanum managanite for the cathode, yttria-stabilized zirconia for the electrolyte lanthanum chromite-doped with magnesium, calcium cobalt, or strontium for the interconnect and a cermet of cobalt or nickel metal with stabilized zirconia for the anode) are first prepared so that the particle size ranges from approximately 1 micron to 10 microns. The respective powders are then mixed with a desired binder and plasticizer in a high intensity mixer 80. For example, to form the electrolyte material, zirconia and yttria are mixed in approximate percentages of 87 to 13 by weight. The binder and plasticizer make up approximately 10–40%, by weight, of the total mix and preferably approximately 18%. The amounts of binder and plasticizer are approximately equal. Porosity may be controlled by using larger sized particles, by adding pore formers, or by using a higher percentage of binder.

Typically, the binder can be selected from the group comprising synthetic rubber, thermosetting plastics, polyvinyl alcohol or polymer systems which thermally decompose without cross-linking. The plasticizer should be a pliable, elastic material that allows low temperature forming of the binder system. Such binders include butyl benzyl phthalate and solvents of the thalate group.

The ceramic powder, binder and plasticizer for a material are combined in the high intensity mixer 80 at room temperature. Each mixer 80 disperses the ceramic powder particles and coats each ceramic particle with binder. The mixing action also raises the temperature through friction to 150° C. and softens the plasticizer. Typically, the time for mixing can be 0.5 to 10 minutes with 2 minutes generally being sufficient.

The mixed material is then removed from the mixer 80 and formed into tapes, preferably immediately after mixing to retain the heat generated by the mixing. Preferably, the tape is formed by a roll mill 82. Alternatively, however, the tapes could be formed by other methods including extruding, pressing or tape casting. In the roll mill 80, each roller is generally heated to approximately 10° C.–150° C., depending on the material and the desired thickness, to assist in the rolling operation. Each material (the anode, cathode, electrolyte and interconnect materials) is individually roll milled into tapes 30, 32, 31 and 33 of the desired thickness. It should be noted that the numerals 30, 31, 32, and 33 will hereinafter designate the material as well as a tape or element formed of that material. Thereafter, a multilayer electrolyte or interconnect wall tape 36 or 38 is roll-milled from at least three of the four tapes 30, 31 or 33, and 32. During this step each tape is friction bonded to the adjacent tape(s). It is important that no voids are formed between or within the respective tape layers during this rolling step. The resulting multilayer electrolyte or interconnect wall tapes 36, 38 may be further calendered if required to reduce the thickness.

To provide passageways for the fuel and oxidant through the MSOFC 10, the plurality of fuel and oxidant passageways 20, 26 are formed, for example, along the anode 30 and cathode 32 respectively. In order to increase the efficiency of the MSOFC 10, it is advantageous to form the passageways 20, 26 by corrugating the trilayer electrolyte tape 36 to achieve greater surface area. This can be accomplished by compression molding, vacuum forming or by gear forming. During this operation, it is important not to get any material flow, thereby retaining the desired layer thicknesses.

Figure 7A:
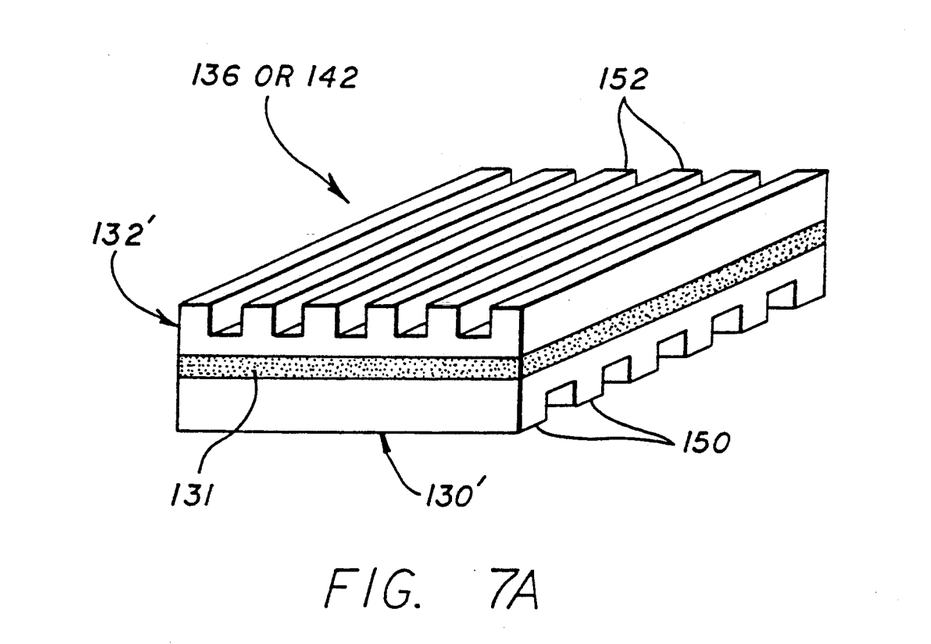
Figure 7B:
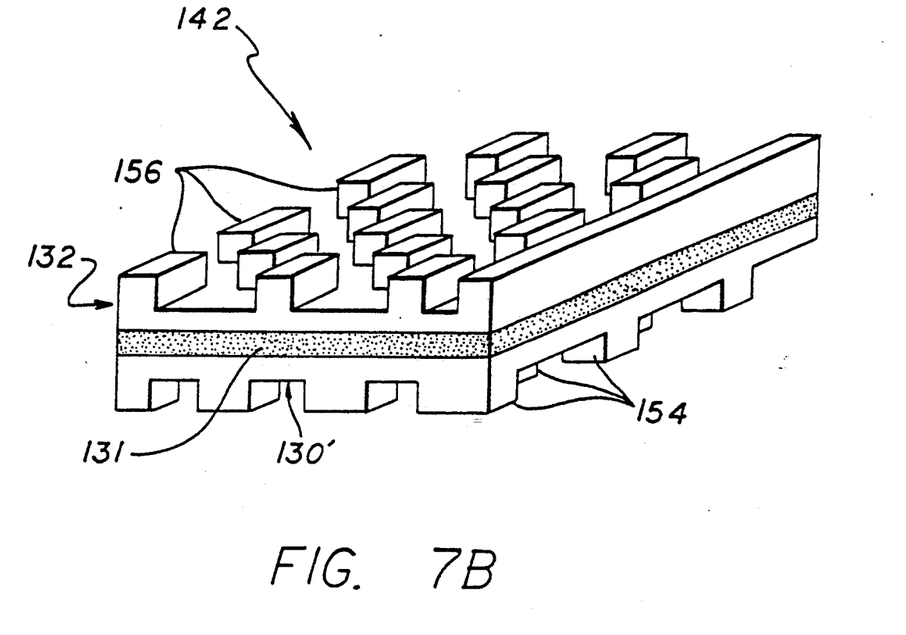
Figure 7C:
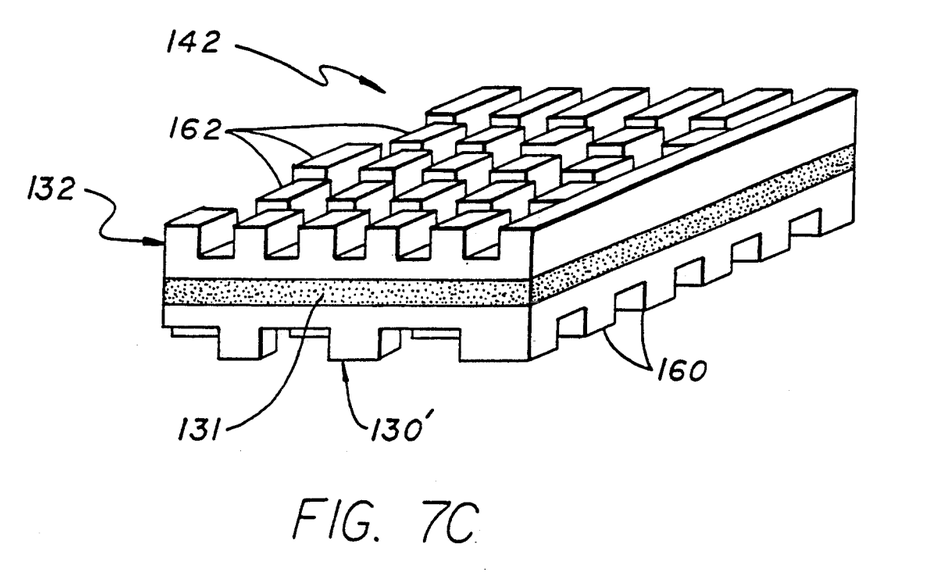

Alternatively, for the crossflow MSOFC 110 a single trilayer electrolyte tape 142 is first formed preferably by the roll milling process or alternatively by a tape casting, extruding or pressing process. Single layer sheets of anode 130' and cathode 132' are first roll milled or tape cast, then formed by a compression molding or similar technique into a corrugated, backfolded, ribbed, or finned configuration, for attachment to the trilayer electrolyte tape 142 as discussed below. In addition, a planar single layer of interconnect 138, or an (anode-interconnect-cathode) interconnect trilayer 140, is formed by either the roll milling or tape casting processes described above. The resulting trilayer tapes 36, 38, 142 and single layer tapes 130', 132', 138 for the respective parallel or crossflow assemblies are then cut or pressed into a plurality of individual elements having preferred gross net shapes (numbered similarly to their respective tapes from which the elements are formed). These gross net shapes preferably include the walls for the manifolds 16, 18, 116, 117, 118, and 119, as well as the corrugations for the passageways 20, 26, 62, 64, if required.

Next comes a heat-treating process, preferably performed in an oven 134, by any one or a combination of radiant, convective, or microwave heating. The heating process proceeds to a temperature sufficient to sinter the respective ceramic materials to a percentage of the desired final density for the respective materials such that subsequent heating and sintering will result in compatible shrinkage of all ceramic material. The sintering temperature is selected to achieve the desired properties, including a dense electrolyte, porous anode and cathode, and dense interconnect. Because the interconnect elements 38, 38', or 138, are heat treated individually, the interconnect ceramic material will not diffuse into adjacent layers of the stacked array during subsequent heating and sintering of the stacked array. The corrugated electrolyte trilayer 36, or the assembled electrolyte trilayer 142 and anode 130' and cathode 13' are separately heat treated as above. These densified components are then preferably allowed to cool to a temperature which allows handling. This initial heat treatment may proceed to the point of only partially sintering the assemblies. Thus, the assembled elements are sintered to at least about twenty five percent of the total sintering required for the final fuel cell as measured by the shrinkage of the materials required to achieve the final desired densities.

The sintered and densified components are then assembled and bonded in their proper sequences into a monolithic structure or stacked assembly 48. During the assembly of the densified components, the contacting surfaces are wetted with a bonding agent 50. The bonding agent 50 is preferably a viscous slurry of anode material or cathode material, and possibly interconnect material, mixed with a compatible binder, plasticizer, and solvent which is brushed 54 or sprayed onto the elements. The selection of the component materials incorporated into the bonding agent 50 is dependent upon the surfaces to be interbonded. To bond two cathode surfaces only cathode materials are used, and similarly to bond an anode surface to an interconnect surface both anode and interconnect materials are used. Similarly, to bond two anode surfaces, only anode materials are used. However, to bond a cathode surface to an interconnect surface both cathode and interconnect materials may be used. By way of example, the bonding agent 50 is formed by combining the selected ceramic component materials with polyvinyl butyryl resin, butyl benzyl phthalate, and isopropyl alcohol into a viscous slurry. Alternatively, the bonding agent 50 may be formed by combining the selected ceramic component materials with materials such as a ceramic paste base, zirconia cement, cellulose-ether compound, a glass-ceramic, or an organo-metallic sol-gel material. Platinum ink or platinum powder may also be added to the bonding agent 50 to improve the electrical conductivity within the MSOFC 20 (or 110).

The stacked assembly 48 is then heat treated, preferably in a furnace or microwave oven 134 operating at temperatures of 1000°–1400° C,, to sinter and densify the bonding agent 50. By way of example, the stacked assembly 48 is heated at ramp rates of 10°–50° C. per hour to 1200° C. The temperature is maintained at 1200° C. for 1 hour, and then the stacked assembly 48 is allowed to gradually cool down. Microwave heating is preferably carried out at a frequency of 28 GHz. In this heat treating procedure, the organics and volatile components of the bonding agent 50 are burned out or outgassed and the component materials (anode, cathode, and interconnect) are sintered to bond adjacent contacting surfaces of the previously sintered and densified subassemblies. This two step sintering and densifying process reduces the thermal induced cracking, slumping of the corrugations, and diffusion of the component materials into adjacent layers, while allowing assembly of a monolithic core having a very high number of individual cells. It should be noted that during the assembly of the sintered subassemblies into the stacked monolith and during the heat treating of the monolith, a compressive force may be applied to promote contact and interbonding at the adjacent surfaces.

It should be evident from the foregoing description that the present invention provides many advantages in the field of manufacturing monolithic solid oxide fuel cells. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. A method of fabricating a monolithic oxide fuel cell, comprising the steps of:
   (a) forming a plurality of multilayer tapes;
   (b) heating said plurality of multilayer tapes until partially densified;
   (c) stacking said partially densified tapes into a monolithic core; and
   (d) heating said core until fully densified.

2. The method of claim 1, wherein said step of forming comprises the steps of:
   mixing ceramic powders required to make an anode, a cathode, an electrolyte, and an interconnect each individually with a binder system to form a batch of each of said materials;

forming thin tapes of each of said materials from said batches;

attaching said anode tape onto one side of said electrolyte tape and said cathode tape on an opposite side of said electrolyte tape to form a trilayer electrolyte tape; and shaping respective sections of said anode tape and said cathode tape into a desired corrugated configuration.

3. The method of claim 2, wherein said mixing step is characterized by the steps of:

selecting a cermet of cobalt or nickel metal with stabilized zirconia for said anode, strontium-doped lanthanum manganite for said cathode, yttria-stabilized zirconia for said electrolyte, and doped lanthanum chromite for said interconnect; and selecting said binder system for compatibility with said anode, cathode, electrolyte, and interconnect materials, said binder system including a binder and a plasticizer.

4. The method of claim 2, wherein said step of forming said thin tapes is characterized by:

fabricating said materials into thin tapes by a process selected from the methods consisting of roll milling, extruding, pressing and tape casting.

5. The method of claim 2, wherein said attaching step is characterized by:

roll milling said anode tape, said electrolyte tape, and said cathode tape within a two roll mill to bond the respective contacting surfaces together.

6. The method of claim 2, wherein said steps of forming said thin tapes and said step of attaching said anode and cathode tapes to said electrolyte are further characterized by tape casting said anode and cathode tapes on opposite sides of said electrolyte.

7. The method of claim 2, wherein said attaching step is further characterized by:

wetting adjacent surfaces of said anode, electrolyte, and cathode tapes with a solution capable of at least partially dissolving said binder system of said tapes.

8. The method of claim 1, wherein said heating steps are characterized by a heating process selected from the group consisting of radiant, convective, and microwave heating.

9. The method of claim 1, wherein said first heating step is characterized by raising the temperature of said multilayer tapes to a temperature sufficient to sinter their respective ceramic materials to at least 25% of the total material shrinkage resulting from sintering the ceramic materials to a desired final density.

10. The method of claim 1, wherein said first heating step is further characterized by raising the temperature of said multilayer tapes to a temperature sufficient to sinter their respective ceramic materials to at least 80% of the total material shrinkage resulting from sintering the ceramic materials to a desired final density.

11. The method of claim 1, wherein said first heating step is further characterized by raising the temperature of said multilayer tapes to a temperature sufficient to sinter their respective ceramic materials to a percentage of the desired final density for said respective materials such that said subsequent heating step of said core will result in compatible shrinkage of all ceramic materials in said core.

12. The method of claim 1, wherein each said tape includes an electrolyte or interconnect sandwiched between an anode and a cathode, and wherein said stacking step is further characterized by:

wetting contacting surfaces of said anode with an anode bonding agent; and wetting contacting surfaces of said cathode with a cathode bonding agent.

13. The method of claim 12, wherein said anode, cathode, electrolyte and interconnect are all formed with a binder system, and wherein said wetting step is further characterized by:

wetting said anode with a solution capable of at least partially dissolving said binder system immediately before attaching said cathode to bond adjacent contacting surfaces.

14. The method of claim 12, wherein said anode and cathode bonding agents are formed by mixing powders of an anode ceramic material for said anode bonding agent, and a cathode ceramic material for said cathode bonding agent respectively, with interconnect ceramic materials, and bonding material.

15. The method of claim 14, further characterized by applying a compressive force to said core during said second heating step.

16. A method of constructing a fuel cell comprising the steps of:

mixing ceramic powders required to make an anode, a cathode, an electrolyte, and an interconnect each individually with a binder system to form a batch of each of said materials;

forming thin tapes of each of said materials from said batches;

attaching said anode tape onto one side of said electrolyte tape and said cathode tape on an opposite side of said electrolyte tape to form a trilayer electrolyte tape;

shaping respective sections of said anode tape and said cathode tape into a desired corrugated configuration;

cutting said trilayer electrolyte tape and said attached shaped anode and cathode tape sections to form a plurality of trilayer electrolyte elements having a desired gross net shape;

cutting said interconnect tape to form a plurality of interconnect elements having a desired shape;

separately heating said trilayer electrolyte elements and said interconnect elements to a temperature and for a duration sufficient to cause removal of the binder system and to partially density said respective materials;

cooling said at least partially densified trilayer electrolyte and interconnect elements;

wetting one surface of said interconnect elements and a surface of said anode of said trilayer electrolyte elements with an anode bonding agent, said anode bonding agent including powders of said anode ceramic material, interconnect ceramic materials, binder system materials, and a solvent mixed into a viscous slurry;

wetting the opposite surface of said interconnect elements and the surface of said cathode of said trilayer electrolyte elements with a cathode bonding agent, said cathode bonding agent including powders of said cathode ceramic material, interconnect ceramic materials, binder system materials, and a solvent mixed into a viscous slurry;

stacking a plurality of said at least partially sintered trilayer electrolyte elements alternately with a plurality of said interconnect elements to form a stacked array; and fully densifying said stacked array to bond the contacting surfaces of said alternately stacked trilayer electrolyte and interconnect elements.

17. A method of constructing a cross flow monolithic solid oxide fuel cell having a plurality of stacked cells, each cell including a cathode, an electrolyte, and an anode, said cells being separated from one another by an interconnect, comprising the steps of:

assembling and at least partially sintering a plurality of electrolyte cell elements, each electrolyte cell element including a trilayer electrolyte having respective interbonded planar layers of cathode, electrolyte, and anode ceramic materials, a corrugated anode ceramic layer bonded to said anode planar layer of said trilayer electrolyte, and a corrugated cathode ceramic layer bonded to said cathode planar layer of said electrolyte trilayer oriented with said corrugations aligned at an angle with respect to said corrugations of said corrugated anode layer, said electrolyte cell elements having a desired configuration;

forming a plurality of interconnect elements in a desired configuration;

separately heating said elements until partially densified wetting one surface of said interconnect elements and projecting surfaces of said corrugated anode of said electrolyte cell elements with an anode bonding agent, said anode bonding agent including powders of said anode ceramic material, said interconnect ceramic materials, a binder system materials, and a solvent mixed into a viscous slurry;

wetting the opposite surface of said interconnect elements and projecting surfaces of said corrugated cathode of said electrolyte cell elements with a cathode bonding agent, said cathode bonding agent including powders of said cathode ceramic material, said interconnect ceramic material, said binder system materials, and a solvent mixed into a viscous slurry;

stacking a plurality of said at least partially sintered electrolyte elements alternately with a plurality of said interconnect elements to form a stacked array; and heating said stacked array to fully densify said elements and to bond the contacting surfaces of said alternately stacked electrolyte cell elements and interconnect elements.

18. The method of claim 1, wherein said step of stacking includes the steps of:

attaching anode sections of said multilayer tapes to form a plurality of at least partially enclosed fuel passageways extending along said anode;

attaching cathode sections of said multilayer tapes to tapes to form a plurality of at least partially enclosed oxidant passageways extending along said cathode;

cutting said tapes to form a plurality of cell assemblies including attached corrugated anode and cathode sections configured in a desired gross net shape; and cutting said interconnect tape to form a plurality of interconnect elements having a desired gross net shape.

19. A method of fabricating a monolithic oxide fuel cell from a plurality of multilayer tapes, comprising the steps of:

(a) sintering said plurality of multilayer tapes until partially densified;

(b) assembling said partially densified tapes into a monolithic core; and (c) sintering said core until fully densified.

* * * * *